US010891168B2

(12) United States Patent
Smola et al.

(10) Patent No.: US 10,891,168 B2
(45) Date of Patent: *Jan. 12, 2021

(54) AUTOMATICALLY SCALING UP PHYSICAL RESOURCES IN A COMPUTING INFRASTRUCTURE

(71) Applicant: Red Hat, Inc., Raleigh, NC (US)

(72) Inventors: Ladislav Smola, Brno (CZ); Greg D. Blomquist, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,338

(22) Filed: Dec. 20, 2018

(65) Prior Publication Data

US 2019/0121675 A1  Apr. 25, 2019

Related U.S. Application Data

(63) Continuation of application No. 15/045,136, filed on Feb. 16, 2016, now Pat. No. 10,162,682.

(51) Int. Cl.
*G06F 9/455* (2018.01)
*G06F 9/50* (2006.01)

(52) U.S. Cl.
CPC .......... *G06F 9/5077* (2013.01); *G06F 9/5083* (2013.01)

(58) Field of Classification Search
CPC .... G06F 3/067; G06F 11/0727; G06F 3/0604; G06F 3/0607; G06F 3/0631; G06F 11/201; G06F 11/2041; G06F 11/2097; G06F 11/3442; G06F 2209/5019; G06F 2209/508; G06F 3/0629; G06F 3/0632; G06F 3/0662; G06F 3/0683; G06F 9/45533; G06F 9/50; G06F 9/5011; G06F 9/5022

See application file for complete search history.

(56) References Cited

U.S. PATENT DOCUMENTS 7,463,648 B1 * 12/2008 Eppstein ............... G06F 9/5011
370/468
9,069,599 B2    6/2015 Martinez et al.
(Continued)

FOREIGN PATENT DOCUMENTS

CN  104065663  9/2014

OTHER PUBLICATIONS

Zumainn, Ismola; OpenStack Infrastructure Auto-Scale; http://manageiq.org/depot/extension/openstack_infrastructure_auto_scale/; 2014; 3 pgs.
(Continued)

*Primary Examiner* — Dong U Kim
(74) *Attorney, Agent, or Firm* — Lowenstein Sandler LLP

(57) ABSTRACT

Implementations of the disclosure describe automatically scaling up physical resources in a computing infrastructure. A method of the disclosure includes determining a change to implement in a physical configuration of a cluster in view of utilization of individual virtual resources and individual physical resources in the cluster, the change indicating one or more actions to be performed to modify a non-provisioned physical resource in view of a cluster type of the cluster, and performing, by a processing device without user interaction, an action to implement the change, wherein the change comprises adding the non-provisioned physical resource to the cluster.

20 Claims, 4 Drawing Sheets

(56) References Cited

U.S. PATENT DOCUMENTS

| | | | | |
|---|---|---|---|---|
| 2002/0174306 | A1* | 11/2002 | Gajjar | G06F 3/0605 711/148 |
| 2005/0193084 | A1* | 9/2005 | Todd | G06F 3/0607 709/214 |
| 2006/0130042 | A1* | 6/2006 | Dias | G06F 9/5083 717/168 |
| 2007/0079290 | A1* | 4/2007 | Roth | G06F 11/3668 717/124 |
| 2011/0153684 | A1* | 6/2011 | Yung | G06F 9/45533 707/805 |
| 2012/0131591 | A1 | 5/2012 | Moorthi et al. | |
| 2012/0271996 | A1* | 10/2012 | Jenkins | G06F 3/0604 711/114 |
| 2013/0014107 | A1* | 1/2013 | Kirchhofer | G06F 9/5083 718/1 |
| 2013/0179574 | A1* | 7/2013 | Calder | G06F 9/5033 709/226 |
| 2014/0012721 | A1* | 1/2014 | Chittigala | G06F 9/50 705/35 |
| 2014/0115579 | A1* | 4/2014 | Kong | G06F 3/0605 718/1 |
| 2014/0280964 | A1 | 9/2014 | Farooq et al. | |
| 2014/0281215 | A1* | 9/2014 | Chen | G06F 3/0604 711/112 |
| 2015/0169291 | A1 | 6/2015 | Dube et al. | |
| 2015/0319050 | A1 | 11/2015 | Kasturi et al. | |
| 2016/0071023 | A1* | 3/2016 | Eicher | G06N 20/00 706/12 |
| 2016/0248646 | A1* | 8/2016 | Ashby, Jr. | H04L 47/78 |

OTHER PUBLICATIONS

Greenwood, Rob; Auto Scaling with OpenStack Heat; http://bilco105.com/2015/06/08/autoscaling-with-openstackheat/; Jun. 8, 2015; 7 pgs.

http://docs.aws.amazon.com/AutoScaling/latest/DeveloperGuide/GettingStartedTutorial.html; Getting Started with Auto Scaling; 2015; 7 pgs.

Polonsky, Ell; Auto-Scaling your Apps with OpenStack Heat—An Orchestration Tool Comparison Pt I of II; http://getcloudify.org/2015/05/20/openstack-summit-vancouver-cloud-network-orchestration-automation-heat-scaling.html; May 20, 2015; 4 pgs.

https://www.youtube.com/watch?v=7SfVZqOVcCI; How to Use Auto Scaling your Applications with AWS; Oct. 25, 2014; 2 pgs.

Hardy, John; Auto Scaling with CloudForms; https://www.youtube.com/watch?v=ELmHIJ6w9Lk; Jul. 15, 2014.

USPTO, Office Action for U.S. Appl. No. 15/045,136, dated Jul. 5, 2017.

USPTO, Final Office Action for U.S. Appl. No. 15/045,136, dated Jan. 2, 2018.

USPTO, Office Action for U.S. Appl. No. 15/045,136, dated Jun. 1, 2018.

USPTO, Notice of Allowance for U.S. Appl. No. 15/045,136, dated Aug. 13, 2018.

* cited by examiner

AUTOMATICALLY SCALING UP PHYSICAL RESOURCES IN A COMPUTING INFRASTRUCTURE

REFERENCE TO RELATED APPLICATION

This application is a continuation of and claims the benefit under 37 U.S.C. § 120 of U.S. patent application Ser. No. 15/045,136, filed Feb. 16, 2016, the entirety of which is incorporated herein by reference.

TECHNICAL FIELD

The present disclosure relates to infrastructure resources, and more particularly, to automatically scaling up physical resources in a computing infrastructure.

BACKGROUND

Computing infrastructures, such as storage systems, virtualization systems, and networking systems, can be provided via data centers and/or cloud computing environments. Resources, such as computing resources, storage resources, and networking resources, may become overloaded and/or under-utilized. At times, the resources may be operating at capacity with no opportunity to improve utilization and/or throughput until additional resources are added to the infrastructure. Infrastructure platforms can capture resource metrics to help monitor the performance of the resources and alert users (e.g., infrastructure administrators) when hardware resources of the infrastructure platform are at or are approaching a critical capacity. Generally, when a user (e.g., infrastructure administrator) receives a capacity alert (e.g., email), a user manually adds physical resources to the infrastructure, which can be a time consuming process. Typically, the manual process causes a time delay from when the user receives the capacity alert and when the physical resource is added to the infrastructure, which results in the infrastructure efficiency remaining poor during the time delay.

BRIEF DESCRIPTION OF THE DRAWINGS

The present disclosure will be understood more fully from the detailed description given below and from the accompanying drawings of various implementations of the disclosure.

DETAILED DESCRIPTION

Aspects and implementations of the present disclosure are directed to automatically scaling up physical resources in a computing infrastructure. A computing infrastructure can be a data center or a cloud, and can include a non-virtual layer and a virtual layer. The virtual layer can include virtual resources, such as virtual machines (Vms), containers, and virtual storage. The non-virtual layer can include physical resources, such as a bare metal system (BMS), host machines, and storage devices. A bare metal system is represented by a computing operating system running on physical hardware without a virtualization layer. At times, the resources may be operating at capacity with no opportunity to improve utilization and/or throughput until new hardware resources are added to the infrastructure. Aspects of the present disclosure detect when new hardware resources should be added to the infrastructure and automatically add appropriate hardware resources to the infrastructure without user interaction or any delay, which is generally caused when a user manually adds new hardware resources to the infrastructure.

Generally, the hardware and virtual resources of an infrastructure are not aware of each other. A physical machine may not be aware of a virtual machine that is running on the physical machine, and the virtual machine may not be aware of the underlying physical machine that is hosting the virtual machine. Computing infrastructures can capture resource metrics to help monitor the performance of the resources. The metrics for the virtual resources are generally separate and independent from the metrics for the physical resources. Aspects of the present disclosure can evaluate the metrics for the virtual resources and the metrics for the physical resources relative to each other.

Aspects of the present disclosure can analyze both pieces of information (e.g., metrics for virtual resources and metrics for physical resources) together and/or in reference to each other, determine capacity for the infrastructure based on the cross-layer analysis, determine whether new physical resource(s) are needed based on the infrastructure capacity, and add the new physical resource(s) without user interaction. Aspects of the present disclosure speed up the operations for scaling up the computing infrastructure and more quickly enable the re-balancing of virtual resources across the physical resources.

Figure 1:
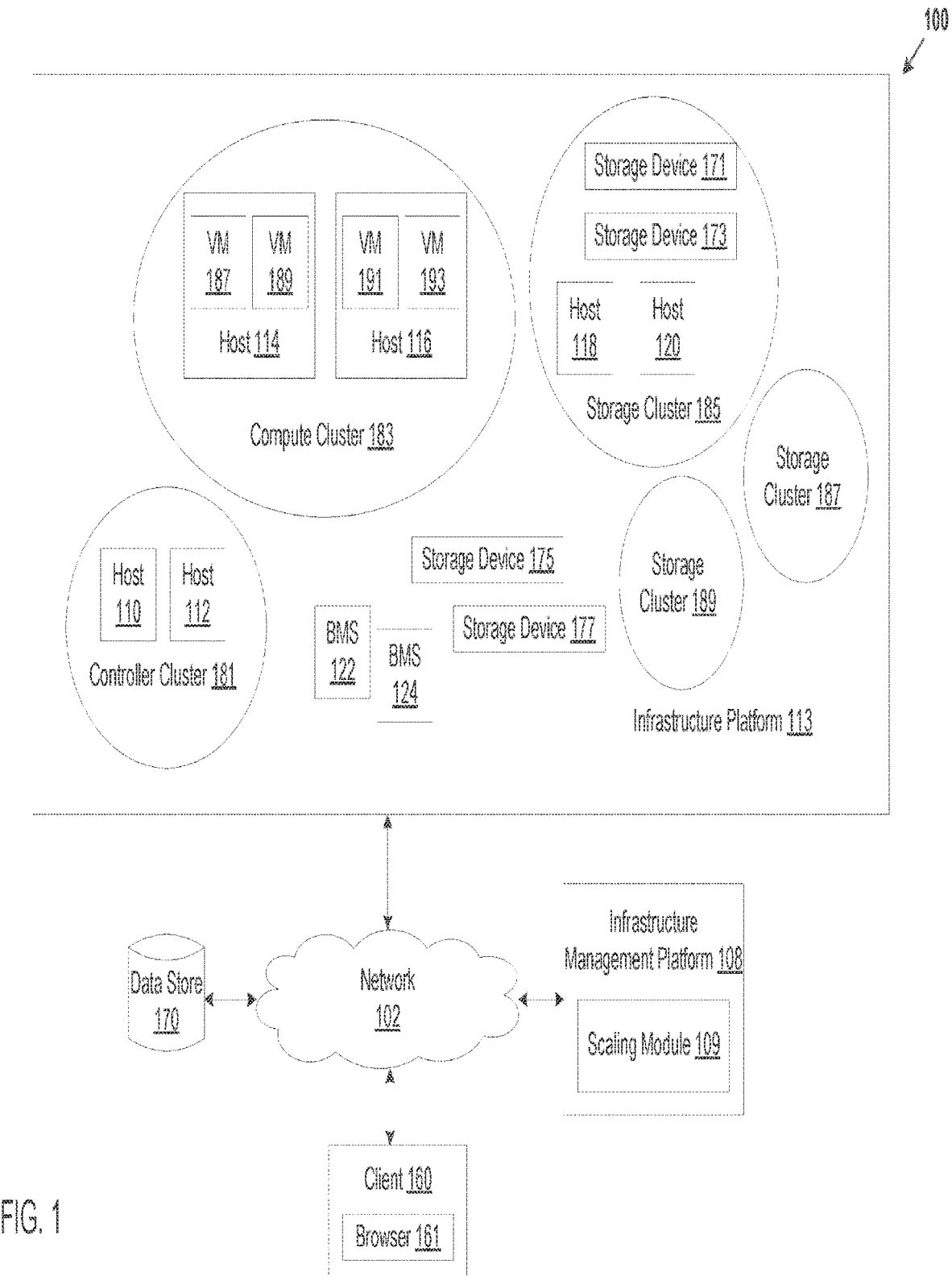
FIG. 1 is an example system architecture in which implementations of the present disclosure can be implemented.

FIG. 1 is an example system architecture 100 in which implementations of the present disclosure can be implemented. The system architecture 100 can include one or more infrastructure platforms 113. The infrastructure platform 113 can be implemented with one or more clouds, and/or one or more data centers. For brevity and simplicity, one infrastructure platform 113 (e.g., cloud, data center) is illustrated and used as an example throughout this document. The infrastructure platform 113 can provide resources (e.g., compute resources, storage resources, network resources) to an entity. An entity, as referred to herein, can represent any software provider, service provider, a business organization such as a corporation, an educational institution such as a college and university, etc. For example, several sub-entities may be different departments within the same entity, such as an Enterprise company, and may store and access data in the infrastructure platform 113.

The infrastructure platform 113 can be a data center, a private cloud, a public cloud, or a hybrid cloud. The resources provided by an infrastructure platform 113 can be virtual resources and/or physical resources. The resources can include components (e.g., virtual machines, containers) of a virtual infrastructure, software defined networks, software defined storage, middleware, and applications. The infrastructure platform 113 can be a physical data center that includes physical computer racks ("racks") each of which has a large number of computers, network devices, and storage devices that are interconnected.

As described above, the infrastructure platform 113 can include a non-virtual layer and a virtual layer. The virtual layer can include virtual resources, such as VMs 187-193 and containers. The non-virtual layer can include physical resources, such as bare metal systems (e.g., BMS 122-124) and host machines ("host") (e.g., host machines 110-120). Bare metal systems 122,124 are computing operating systems executing on physical computing hardware without a virtualization layer. Host machines 110-120 are physical computing machines that host software (e.g., applications, servers) and/or a virtualization layer. For example, host machine 114 is the underlying computing hardware that includes a hypervisor to host VMs 187-189. Individual bare metal systems and host machines can be a server computer system, a desktop computer or any other computing device.

The infrastructure platform 113 can provide compute resources, storage resources, and/or network resources to entities. Compute resources can include processing devices, bare metal systems (e.g., BMS 122-124), virtual machines (e.g., VMs 187-193), software containers, host machines 110-120, applications, memory, hypervisors, etc. Storage resources can include, and are not limited to, storage servers, storage software, disks, data stores, software defined storage, etc. Network resources can be virtual network resources, software defined networks, etc.

An example of a cloud infrastructure platform 113 can include and is not limited to Red Hat® OpenStack®. The cloud infrastructure platform 113 can implement one or more clusters. Each cluster can be dedicated to performing one or more certain functions. A cluster hereinafter refers to a group of connected hosts that work together for one or more particular functions. for example, the cloud infrastructure platform 113 can include a controller cluster 181, a compute cluster 183, and one or more storage clusters 185. Examples of functions can include, and are not limited to, virtualization, storage, networking, etc. For example, the controller cluster 181 can include one or more host machines (e.g., host machines 110,112) that include network management software for managing networking infrastructure, APIs (application programming interfaces), and communications for the infrastructure platform 113.

The compute cluster 183 can include one or more host machines (e.g., host machines 114,116) for hosting virtual machines (e.g., virtual machines 187-193). There can be a large number of virtual machines, containers, and/or containers within virtual machines in the infrastructure platform 113. For brevity and simplicity, two virtual machines (e.g., VMs 187-189) hosted by host machine 114 and two virtual machines (e.g., VMs 191-193) hosted by host machine 116 are used as examples in system architecture 100.

The individual storage clusters 185-189 can include one or more hosts and one or more storage devices to manage storage for the data in the infrastructure platform 113. For brevity and simplicity, two host machines 118,120, which can include storage servers, and two storage devices 171,173 are used as examples in system architecture 100. For example, the storage cluster 185 can manage virtual hard drives on storage devices 171,173 for virtual machines 187-193 in the infrastructure platform 113. The storage devices 171,173 can create a storage array for storing data in the infrastructure platform 113.

The infrastructure platform 113 can include one or more types of storage clusters. One type of storage cluster (e.g., storage cluster 185) can manage block storage for virtual disks, for example, for the virtual machines (e.g., VMs 187-193) in the compute cluster 183. Another type of storage cluster (e.g., storage cluster 187) can manage object storage for files. Another type of storage cluster (e.g., storage cluster 189) can manage both block storage and object storage in a single cluster for the virtual machines in the compute cluster.

Users can interact with applications executing on infrastructure resources, such as VMs 187-193, using client computer systems, such as client 160, via corresponding applications (e.g., web browser program 161). There can be a large number of clients. For brevity and simplicity, client 160 is used as an example in architecture 100. The client 160 can be connected to the one or more hosts 114,116 in a compute cluster 183 via a network 102. The client 160 can be a mobile device, a PDA, a laptop, a desktop computer, or any other computing device.

The cloud infrastructure platform 113 can be managed by an infrastructure management platform 108. Examples of a infrastructure management platform 108 can include and are not limited to Red Hat® CloudForms and Red Hat® ManageIQ®. The infrastructure management platform 108 can manage infrastructures that have tree/graph based inventories, such as infrastructure platform 113. The cloud infrastructure platform 113 can be coupled to the infrastructure management platform 108 via the network 102, which may be a private network (e.g., a local area network (LAN), a wide area network (WAN), intranet, or other similar private networks) or a public network (e.g., the Internet). The infrastructure management platform 108 can be hosted by one or more machines (e.g., server computers, desktop computers, etc.). The infrastructure management platform 108 can be maintained by a consumer, such as an Enterprise (e.g., business, company), of the infrastructure platform 108. In another implementation, the infrastructure management platform 108 can be maintained by a cloud provider or a data center provider. The infrastructure management platform 108 can be coupled to multiple infrastructure platforms 113 via one or more networks 102.

The infrastructure management platform 108 can manage the deployment of resources (e.g., bare metal systems, hosts, virtual machines, containers, containers within VMs, storage devices, storage servers, etc.) in the infrastructure platform 113. The infrastructure management platform 108 can receive input, for example, from a system administrator via the client 160, requesting a VM (e.g., VM 131), a host (e.g., host 110-120), and/or a bare metal system (e.g., host 118-124) to be deployed in infrastructure platform 113. A request can be for a large number of resources, and the infrastructure management platform 108 can receive a large number of requests.

The resources can be executing workloads. A workload can be an independent service or collection of code that can be executed. A workload is the amount of processing that the resource (e.g., bare metal system, host machine, virtual machine) has been given to do at a given time. Examples of a workload can include an application, a virtual machine, a container, and a process. For example, a bare metal system or a host machine may have an application as a workload. In another example, a host machine may have one or more virtual machines as workloads. In another example a virtual machine may have multiple containers as workloads.

Over time, the workloads on an infrastructure resource may cause the resource to become overloaded and/or a resource may become underutilized. At times, the resources of the clusters 181-189 of the infrastructure platform 113 may be operating at capacity and/or approaching maximum capacity for a particular metric (e.g., CPU, memory). The utilization (e.g., CPU utilization, memory utilization) may be improved for a resource by transferring a workload of the resource to another resource within the cluster to re-balance the workloads amongst the resources in the cluster. At times, there may be no other resource within the cluster that has available capacity to accommodate a resource transfer, which can result in no opportunity to improve utilization and/or throughput of the resource until new hardware resources are added to a respective cluster.

The infrastructure management platform 108 can include a scaling module 109 to evaluate the utilization of the resources (e.g., VMs, containers, bare metal servers, hosts, storage devices, networking, etc.) in the infrastructure platform 113. The scaling module 109 can access performance data for one or more metrics for the resources in the infrastructure platform 113. The performance data can be stored in one or more data stores 170. The metrics can be for example, central processing unit (CPU) data, memory data, hard drive or disk data, and network data. The infrastructure management platform 108 can collect performance data for one or more metrics for the resources in the infrastructure platform 113. The metrics can be for example, central processing unit (CPU) data, memory data, hard drive or disk data, and network data. The infrastructure management platform 108 can request performance data from the infrastructure platform 113 on a per request basis, based on a schedule, at a particular time, etc. The request can be for metric performance data for a period of time (e.g., last hour). The period of time can be specified in configuration data that is stored in a data store 170. The period of time can be configurable and/or user-defined.

In response to a request, the infrastructure management platform 108 can receive one or more data streams for a metric (e.g., CPU information, hard drive information) for a particular resource (e.g., VM, host machine) from the infrastructure platform 113. The data streams can have different measurement parameters. The measurement parameters can include, for example, the time intervals between data points in a data stream, the frequency of data points in a data stream, etc. The infrastructure management platform 108 can normalize the data streams according to one or more specified measurement parameters (e.g., time interval, data point frequency) to create uniform data streams. The infrastructure management platform 108 can create a data structure that stores the data for the uniform data streams. For example, the data structure can be a key-value database that uses the time-stamps for the data points in the uniform data streams as keys. The data structure can be stored in one or more data stores (e.g., data store 170).

A data store 170 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Unlike conventional infrastructure management solutions that keep performance data of the virtual layer of the infrastructure platform 113 separate from performance data of the physical layer of the infrastructure platform 113, the scaling module 109 in implementations of the present disclosure can analyze the performance data (e.g., uniform data streams) across the multiple layers (e.g., physical layer and virtual layer) for the resources in the clusters 181-189 and determine the utilization of the resources in the respective clusters 181-189 for one layer relative (e.g., virtual layer) to another layer (e.g., physical layer). Determining the utilization from the performance data is described in greater detail below in conjunction with FIG. 2. The scaling module 109 can determine that new hardware should be added to a particular cluster based on the utilization and capacity of the resources in the respective cluster, and can cause the new hardware to automatically be added to the corresponding cluster without user interaction.

For example, the compute cluster 183 can include host 114, which may be executing VM 187 and VM 189 as workloads, and host 116, which may be executing VM 191 and VM 193 as workload. The scaling module 109 can determine from the performance data of the virtual resources that VM 187, VM 189, VM 191 and VM 193 are each running at 80% capacity. The scaling module 109 can also determine from the performance data of the physical resources that host 114 and host 116 are each running at 80% capacity. Based on the capacities of the virtual resources and the physical resources in the compute cluster, the scaling module 109 may determine that neither the VM 187 workload nor the VM 189 workload can be moved from host 114 to host 116, and similarly, neither the VM 191 workload nor the VM 193 workload can be moved from host 116 to host 114. The scaling module 109 may determine that there is not a better workload configuration using the existing physical resources in the compute cluster 183 that would improve the throughput and/or utilization of the resources in the compute cluster 183, and that a new host should be added to the compute cluster 183 to increase the capacity of the compute cluster 183 to improve the utilization of the resources in the compute cluster 183.

Unlike conventional infrastructure management solutions that may only send an email to notify a user (e.g., could administrator) that a capacity threshold is met, and the user then manually adds hardware to a cluster, the scaling module 109 in the implementations of the present disclosure can cause new hardware to be automatically added to a cluster without user intervention and/or user interaction.

The infrastructure platform 113 can include one or more available physical resources (e.g., hosts, bare metal systems, storage devices, etc.). The physical resources are available in that the physical resources have not yet been provisioned to any cluster (e.g., cluster 181-189) in the infrastructure platform 113. The available physical resources ("non-provisioned physical resources") can be pre-assembled and physically connected to one or more physical resources that are already provisioned to a particular cluster. For example, bare metal system 122 may not be provisioned to any cluster in the infrastructure platform 113, but may be physically connected to the hosts 114,116 in the compute cluster 183 over a network in the infrastructure platform 113. In another example, bare metal system 124 may not be provisioned to any cluster in the infrastructure platform 113, but may be physically connected to the hosts 118,120 and storage devices 171,173 in the storage cluster 185 over a network in the infrastructure platform 113.

Provisioning a resource can include assigning the resource to a cluster and configuring the resource for the particular function that is being provided by the cluster. Configuring the resource can include, for example, installing a virtualization layer (e.g., hypervisor) on the resource, installing an application on the resource, assigning logical unit numbers (LUNs) within a network for the resource, assigning storage space to the resource, etc. For example, a bare metal system may be provisioned for the compute cluster by assigning the resource to the compute cluster, and adding a virtualization layer to the bare metal system.

A resource can be assigned to a particular cluster by updating cluster management data that is stored in a data store 170. The infrastructure management platform 108 can create cluster management data to track the individual resources of each cluster in the infrastructure platform 113. The infrastructure management platform 108 can perform an inventory scan of the infrastructure platform 113 to collect resource data from each resource in the infrastructure platform 113. The cluster management data can include resource identifiers, the type (e.g., bare metal system, host machine, VM, container, storage server, storage device, virtual storage device, etc.) of the resource, cluster identifiers, the type of cluster, etc.

The scaling module 109 can instruct the cloud infrastructure platform 113 to automatically configure and add a new physical resource (e.g., the bare metal system 122) to the cluster (e.g., compute cluster 183) based on the cluster management data, without any user interaction, to allow the bare metal system 122 to become a host to run one or more virtual machines (e.g., VMs 187-193).

Figure 2:
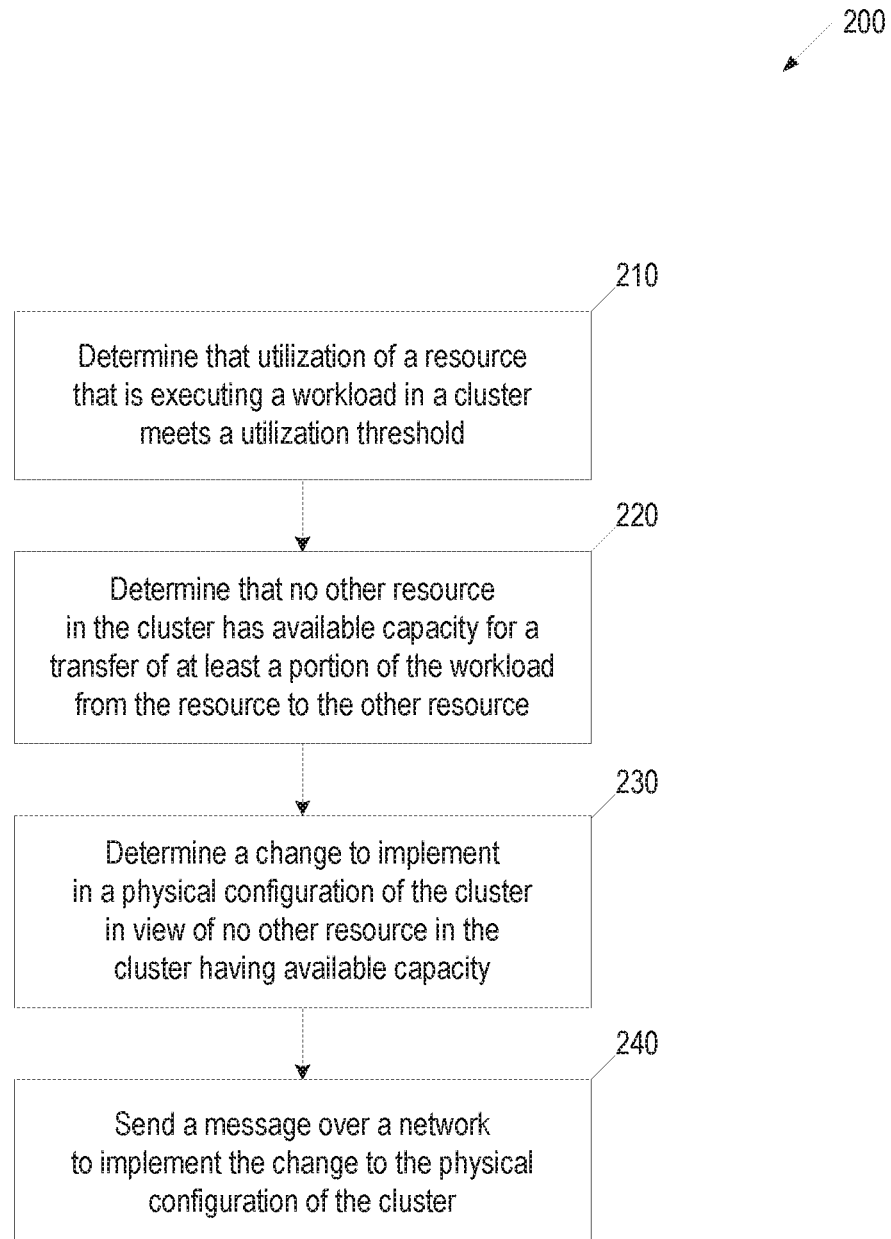
FIG. 2 is a flow diagram for a method for automatically changing a physical configuration of a cluster an infrastructure platform, in accordance with one or more implementations of the present disclosure.

FIG. 2 is a flow diagram for a method 200 for automatically changing a physical configuration of a cluster in an infrastructure platform, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a scaling module (e.g., scaling module 109 of FIG. 1) executed by a processing device in a computing machine. At least a portion of method 200 can be performed automatically by the computing machine without user interaction.

At block 210, the processing device determines that utilization of a resource that is executing a workload meets a utilization threshold. The resource is part of a group of resources in a cluster. The resource can be a physical resource (e.g., bare metal system, host machine, storage devices, etc.) or a virtual resource (e.g., virtual machines, containers, virtual disks, etc.). The workload can include, for example, execution of a virtual machine, execution of a container, CPU workload, storage I/O, etc. The processing device can access performance data for the one or more resources of the cloud cluster, and determine the utilization for the one or more resources that are executing the workload(s) in the particular cloud cluster. The infrastructure management platform can collect performance data for one or more metrics for the resources from the resources and store the performance data in a data store. The metrics can be for example, CPU data, memory data, hard drive or disk data, and network data. The performance data can be one or more data streams for a metric (e.g., CPU information, hard drive information) for a particular resource (e.g., VM, host machine) that are received from the infrastructure platform.

The utilization of the resource can be for a component of the resource. Examples of components of the resource can include CPU, memory, storage, networking, etc. The utilization can be represented as a percentage. The utilization can be, for example, CPU utilization, memory utilization, I/O utilization, storage utilization, network utilization, etc. The infrastructure management platform can normalize the data streams that are received from the infrastructure platform according to one or more specified measurement parameters (e.g., time interval, data point frequency) to create uniform data streams and can create a data structure that stores the data for the uniform data streams. For example, the data structure can be a key-value database that uses the time-stamps for the data points in the uniform data streams as keys. The data structure for the performance data can be stored in one or more data stores (e.g., data store 170 in FIG. 1). The processing device can use the uniform data streams and/or the data streams received from the infrastructure platform to determine the utilization of a resource.

In one example, a single data stream can include data points of the percentage utilization for a particular metric for a period of time (e.g., last hour, specified time period, etc.), and the processing device can use a single data stream to determine utilization for a particular metric of a resource. For example, the processing device can access a data stream for percentage (%) memory utilization information for the last hour for a particular VM in the cluster. In another example, the processing device can access a data stream for percentage (%) CPU utilization for the last hour for a particular VM in the cluster. The CPU utilization is a measurement that represents a resource's usage of processing resources, or the amount of work handled by a CPU for the resource.

In another example, the processing device can use multiple data streams for a particular metric of a resource to determine utilization for the particular metric of the resource. For example, the processing device can access a pair of data streams for memory information for the last hour for a host machine in a cluster. One data stream can include data points for the amount of used memory for the last hour for a host machine, and the other data stream can include data points for the amount of total memory for the last hour for the host machine. The processing device can determine the memory utilization as the percentage of memory used as compared to the amount of total memory for the various points in time in the time period (e.g., last hour). The processing device can determine the memory utilization as the average of the percentages for the various points in time.

In another example, the processing device may receive a pair of data streams for virtual hard drive information for the last hour for a particular VM in the cluster. One data stream can include data points for the amount of bytes read for the last hour for the VM, and the other data stream can include data points for the amount of bytes written to for the last hour for the VM. The processing device can determine the virtual hard drive utilization and/or virtual disk utilization as the percentage of bytes read as compared to the amount of bytes written to for the various points in time in the time period (e.g., last hour). The processing device can determine the virtual hard drive utilization and/or virtual disk utilization as the average of the percentages for the various points in time.

The utilization threshold can indicate whether a resource is at a critical capacity limit (e.g., maximum capacity, 20% below maximum capacity) or approaching the critical capacity limit. The critical capacity limit can be a value or a percentage. The critical capacity limit can be configurable and/or user-defined. The critical capacity limit can be stored in a capacity policy in a data store (e.g., data store 170 in FIG. 1). The utilization threshold can be represented as a value or a percentage. The utilization threshold can be configurable and/or user-defined. The utilization threshold can be stored in policy data in a data store. The utilization threshold, when met, can automatically trigger one or more actions to be taken to change the physical configuration of the cluster. For example, the policy may specify an 80% utilization threshold for triggering re-balancing of the resources in the cluster. There-balancing of the resources in a cluster is the transfer of at least a portion of a workload on a resource to one or more other resources in the cluster to improve (e.g., reduce) the utilization of the resource that is having the workload(s) transferred.

At block 220, the processing device determines that no other resource in the cluster has available capacity to the other resource. The processing device can make the determination based on one or more capacity criteria specified in a capacity policy that is stored in a data store. The capacity criteria can include a minimum amount of available capacity that a resource should have to allow the resource to be a candidate for receiving a transfer of a workload from another resource. The capacity criteria can include selection preferences (e.g., resource having the greatest amount of available capacity) for when there are multiple resources in the cluster that are candidates for re-balancing. The processing device can determine the available capacity of each resource in the cluster from the performance data. For example, the processing device can determine the available capacity of a resource based on the utilization of the resource. The processing device can determine that none of the existing physical resources in the cluster have available capacity that satisfies the one or more capacity criteria to be a candidate resource to accommodate the re-balancing of any of the transferred workloads.

For example, the processing device may determine that Host-1 has a 20% available capacity. The capacity policy may specify a 30% available capacity as a criterion for a resource to be are—balancing candidate resource. The processing device may also determine that Host-2 has a 25% available capacity. The processing device can determine from the capacity of Host-1 and Host-2 that none of the workloads on Host-1 should be moved to Host-2, and that none of the workloads on Host-2 should be moved to Host-1 because each host does not have the minimum available capacity.

At block 230, the processing device determines a change to implement in a physical configuration of the cluster in view of no other resource in the cluster having available capacity. The change can be to add a new physical resource to the cluster. The processing device can determine the number of new physical resources that should be added to the cluster based on the utilization of the resources in the cluster and the capacity policy, as described in greater detail below in conjunction with FIG. 3. The change can specify which new physical resource to add to the cluster. The processing device can identify, without user interaction, one or more non-provisioned physical resources that are candidate resources that can be added to the cluster. The non-provisioned physical resources can be pre-assembled and physically connected to one or more physical resources that are already provisioned to the cluster. For example, Bare-Metal-System-1 may not be provisioned to the compute cluster, but may be already physically connected to the Host-1 and Host-2 in the compute cluster over a network in the cloud.

The processing device can select which non-provisioned physical resources should be added to the cluster for the change based on preference(s) specified in the capacity policy. The preferences in the capacity policy may specify that the non-provisioned physical resource(s) that is in closest physical proximity to the existing hosts in the cluster should be added to the cluster.

The change can specify how to modify the non-provisioned physical resource for the cluster. The processing device can determine the type (e.g., compute cluster, controller cluster, storage cluster) for the cluster, for example, from the cluster management data in a data store. The processing device can use the cluster type to determine one or more actions to be performed for modifying the non-provisioned physical resource for the cluster. The processing device can determine the actions from configuration data that is stored in a data store that specifies the one or more actions to be taken based on the cluster type. The actions are described in greater detail below in conjunction with FIG. 3.

At block 240, the processing device sends a message over a network to implement the change, without user interaction, to the physical configuration of the cluster. The processing device can send one or more messages to an infrastructure platform implementing the cluster to add the selected new physical resource(s) (non-provisioned physical resource) to the physical layer of the cluster. The processing device can communicate the one or more messages to the infrastructure platform via an application programming interface (API). The one or more messages can include an identifier (e.g., host identifier, bare metal system identifier) for the selected new physical resource, a cluster identifier of the cluster where the new physical resource is to be added, and or one or more actions to be performed for adding the new physical resource to the cluster. The new physical resource to be added to the cluster is already physically coupled to at least one physical resource in the cluster. The new physical resource (e.g., host machine Host-3) that is added to the cluster can be used to move at least a portion of one or more workloads (e.g., virtual machines) from an existing host (e.g., Host-1, Host-2) in the cluster to the new physical resource (e.g., Host-3) to improve the utilization of the resource having the workload transferred, as well as the utilization of the cluster as a whole.

Figure 3:
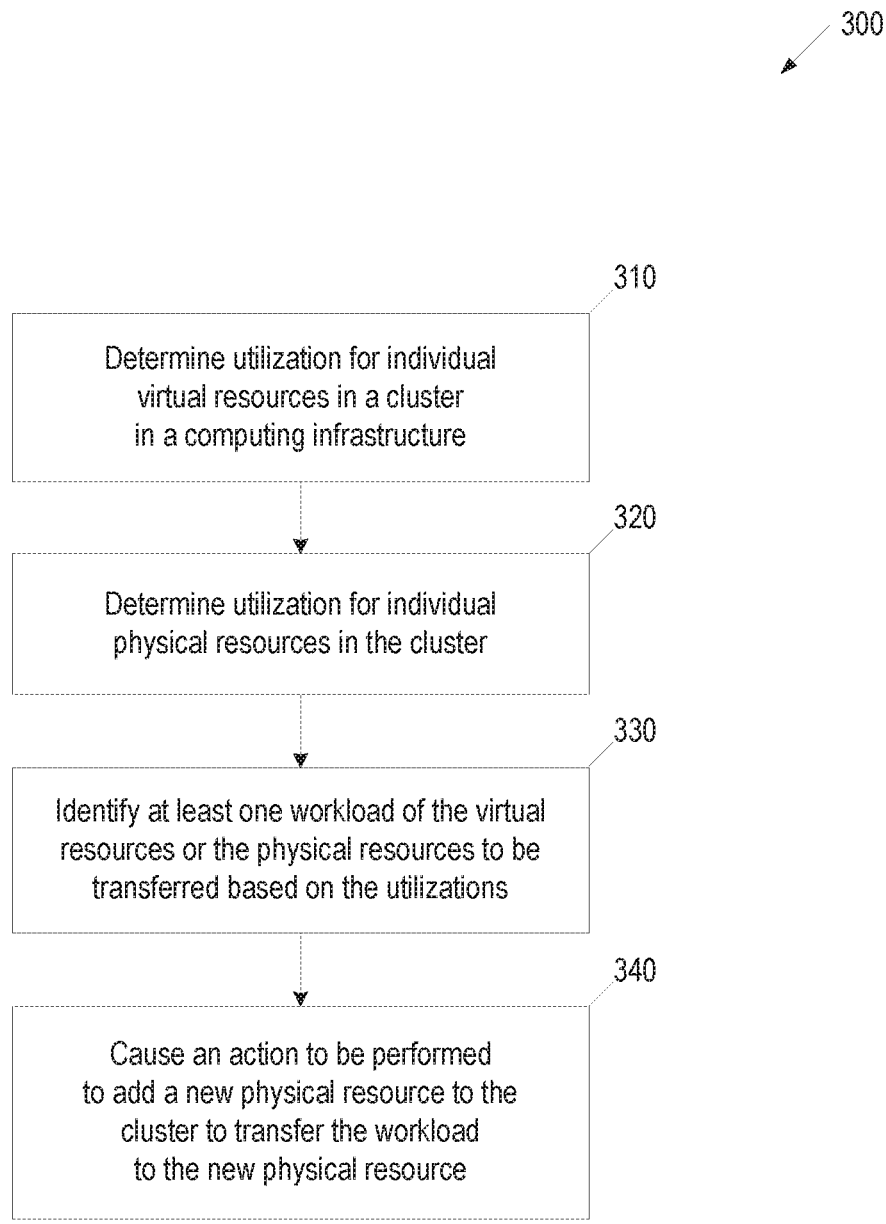
FIG. 3 is a flow diagram for a method for automatically adding a new physical resource to a cluster based on utilization of virtual resources and physical resources of the cluster, in accordance with one or more implementations of the present disclosure.

FIG. 3 is a flow diagram for a method 300 for automatically adding a new physical resource to a cluster based on utilization of virtual resources and physical resources of the cluster, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a scaling module (e.g., scaling module 109 of FIG. 1) executed by a processing device in a computing machine. At least a portion of method 300 can be performed automatically by the computing machine without user interaction.

At block 310, the processing device determines utilization for individual virtual resources in a cluster in a computing infrastructure. The processing device can identify the virtual resources (e.g., virtual machines, containers) that are running on each host machine in the cluster, for example, from cluster management data that is stored in a data store. The processing device can obtain performance data corresponding to the virtual resources from the data store. The performance data can include one or more data streams for each virtual resource, and the processing device can determine the utilization from the data streams.

The processing device can determine utilization for one or more metrics (e.g., CPU utilization, memory utilization, I/O utilization) for each virtual resource in the cluster. The number of metrics and the type of metrics can be based on configuration data that is stored in a data store. For example, may determine the CPU utilization and/or memory utilization for each virtual machine on each host machine in the compute cluster. The processing device may also identify all of the containers that are running on each virtual machine in the compute cluster, and may determine, from the performance data, the CPU utilization and/or memory utilization for each container on each virtual machine in the compute cluster. In another example, the cluster may be a storage cluster and the processing device may identify all of the virtual disks being managed in the storage cluster. The processing device may determine, from the performance data, the I/O (input/output) utilization for each virtual disk in the storage cluster. The I/O utilization is a measurement that represents the reads and writes that are made on the disk (e.g., virtual disk).

At block 320, the processing device determines utilization for individual physical resources in the cluster. The processing device can identify the physical resources (e.g., host machines, bare metal systems, storage devices, etc.) that are in the cluster, for example, from cluster management data that is stored in a data store. The processing device can obtain performance data corresponding to the physical resources from the data store and determine the utilization from the performance data. The processing device can determine utilization for one or more metrics (e.g., CPU utilization, memory utilization, I/O utilization) for each virtual resource in the cluster. The number of metrics and the type of metrics can be based on configuration data that is stored in a data store. For example, for a compute cluster, the processing device may identify all of the host machines that are in the compute cluster, and may determine, from the performance data, the CPU utilization and/or memory utilization for each host machine in the compute cluster.

At least one of the physical resources in the cluster is related to at least one of the virtual resources in the cluster. For example, for a compute cluster (e.g., compute cluster 183 in FIG. 1), which is dedicated to providing virtual machines and/or containers, the virtual resource may be a virtual machine or a container running in a virtual machine. The compute cluster can include a physical resource that is a host machine, which is related to the VM and/or container, by hosting the VM and/or container. In another example, for a storage cluster (e.g., compute cluster 185 in FIG. 1), which is dedicated to providing a storage service, the virtual resource may be a virtual disk. The storage cluster can include a physical resource that is a physical computing machine that is running a storage server and is related to the virtual disk by managing the virtual disk. In another example, the storage cluster may include a physical resource that is a physical disk and may be related to the virtual disk by being the underlying storage device for the virtual disk.

At block 330, the processing device identifies at least one workload of the virtual resources or the physical resources to be transferred based on the utilizations. The identified workload(s) can be transferred to at least one other resource. The processing device can determine which virtual resources and/or physical resources are being over-utilized or becoming over-utilized by comparing the respective utilizations to corresponding utilization thresholds that are stored in a data store.

For each resource (e.g., physical resource, virtual resource) that has a utilization that meets a utilization threshold, the processing device can select one or more workloads or at least a portion of one or more workloads of the resource to transfer from the resource. The processing device can make a selection based one or more selection criteria that is stored in a data store. The selection criteria can be configurable and/or user-defined. The selection criteria may specify, for example, that the processing device selects a workload or a portion of a workload that can reduce the utilization of the resource to a certain amount, which may be specified in a policy in a data store.

At block 340, the processing device causes one or more actions to be performed to add a new physical resource to the cluster to transfer the workload to the new physical resource. The actions can be for assigning the resource to a cluster and configuring the resource for the particular function that is being provided by the cluster. Example actions for configuring the resource can include installing a virtualization layer (e.g., hypervisor) on the new physical resource, installing an application on the new physical resource, assigning logical unit numbers (LUNs) within a network for the new physical resource, assigning storage space to the new physical resource, etc.

The processing device can send one or more messages to an infrastructure platform implementing the cluster. The one or more messages can include an identifier of a new physical resource to add to the cluster, a cluster identifier of the cluster where the new physical resource is to be added, and or one or more actions to be performed for adding the new physical resource to the cluster. The new physical resource to be added to the cluster is already physically coupled to at least one physical resource in the cluster. The new physical resource that is added to the cluster can be used to transfer at least the selected portion and/or selected workload(s) from the resource that is over-utilized or becoming over-utilized to the new physical resource.

The processing device may determine to add multiple new physical resources. The number of new physical resources to add to the cluster can be based on the number of resources (e.g., virtual resources, physical resources) that are over-utilized or becoming over-utilized as indicated by the utilization threshold, and the utilization of the resources that are over-utilized or becoming over-utilized. The processing device can iteratively add a new physical resource until each of the resources that are over-utilized or becoming over-utilized have workloads transferred such that their respective utilizations are below the utilization threshold.

Figure 4:
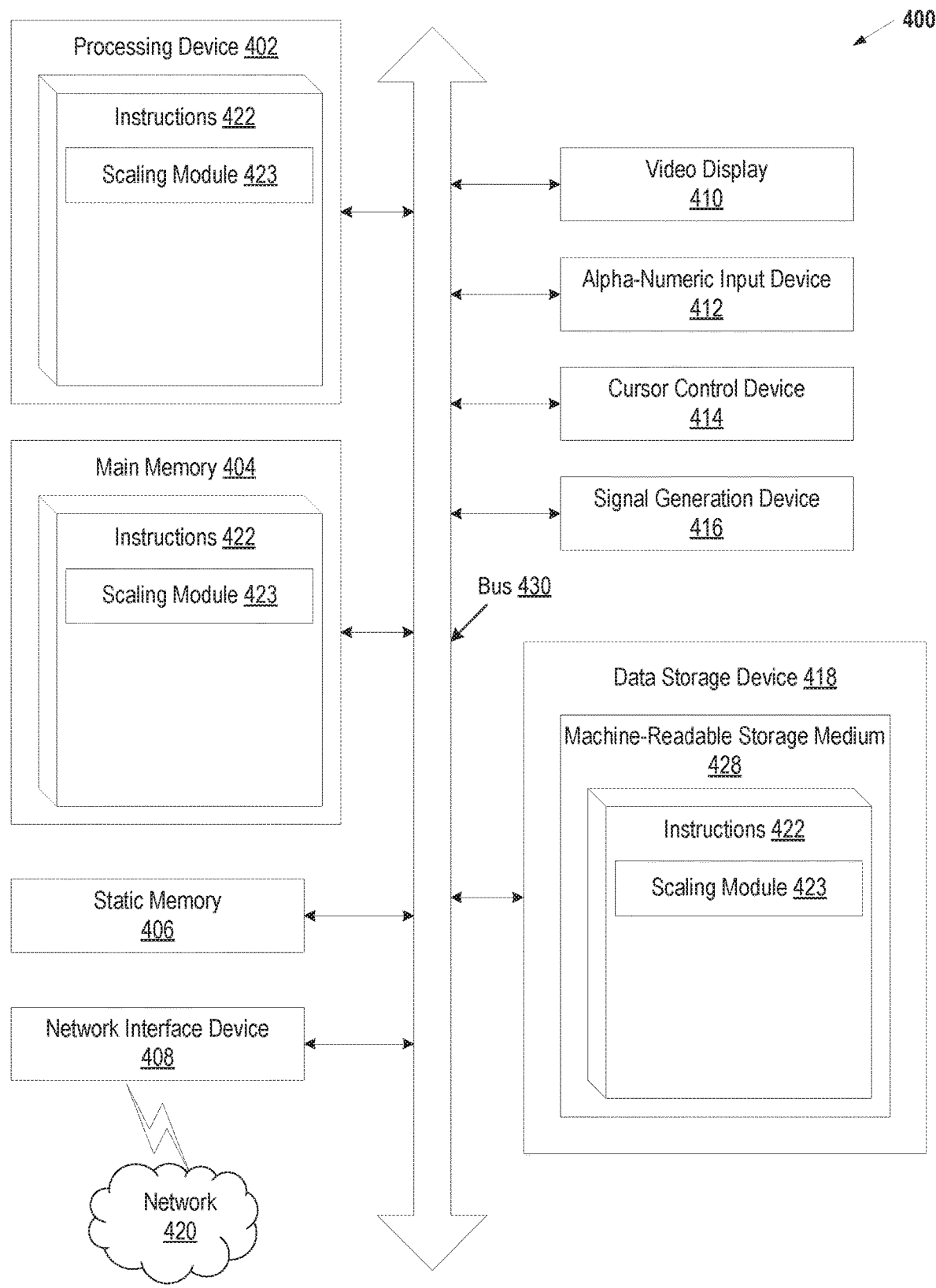
FIG. 4 is a block diagram of an example computer system that may perform one or more of the operations described herein.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data store device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT), an alphanumeric input device 412 (e.g., a keyboard), a cursor control device 414 (e.g., a mouse), and a signal generation device 416 (e.g., speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media.

In one implementation, the instructions 422 include instructions for a scaling module 423 (e.g., scaling module 109 of FIG. 1), and/or a software library containing methods that call the scaling module 423. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining" or "sending" or "identifying" or "causing" "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   determining that no physical resource in a plurality of resources of a cluster has available capacity in view of utilization of individual virtual resources and individual physical resources in the cluster;
   determining a change to implement in a physical configuration of the cluster in view of the utilization of the individual virtual resources and the individual physical resources in the cluster, the change indicating one or more actions to be performed to modify a non-provisioned physical resource in view of a cluster type of the cluster; and performing, by a processing device without user interaction, an action to implement the change, wherein the change comprises adding the non-provisioned physical resource to the cluster.

2. The method of claim 1, wherein the non-provisioned physical resource comprises at least one of a bare metal system, a host computing machine, or a storage device.

3. The method of claim 1, further comprising adding the non-provisioned physical resource by:
identifying the non-provisioned physical resource that is physically coupled to at least one of the plurality of resources of the cluster.

4. The method of claim 1, wherein performing the action to implement the change comprises:
sending a message to an infrastructure platform implementing the cluster to add the non-provisioned physical resource to the cluster.

5. The method of claim 4, wherein the message comprises at least one of an identifier of the non-provisioned physical resource that is physically coupled to at least one of the plurality of resources of the cluster or an identifier of the cluster.

6. The method of claim 1, wherein the cluster comprises at least one of a cluster that is dedicated to providing one or more virtual machines, a cluster that is dedicated to providing a storage service, or a cluster that is dedicated to providing a networking service.

7. The method of claim 1, wherein determining that no physical resource in the plurality of resources of the cluster has available capacity comprises:
determining capacity of physical resources in the plurality of resources; and
determining none of the physical resources in the plurality of resources has a capacity that meets a specified minimum amount of capacity.

8. A non-transitory computer-readable storage medium including instructions that, when executed by a processing device, cause the processing device to:
determine that no physical resource in a plurality of resources of a cluster has available capacity in view of utilization of individual virtual resources and individual physical resources in the cluster;
determine, by the processing device, to add one or more physical resources to the cluster in view of the utilization of the individual virtual resources and the individual physical resources in the cluster;
select, by the processing device, one or more non-provisioned physical resources in view of one or more preferences specified in a policy;
modify, by the processing device, the selected one or more non-provisioned physical resources in view of a cluster type of the cluster; and
add, by the processing device, the selected one or more non-provisioned physical resources to the cluster.

9. The non-transitory computer-readable storage medium of claim 8, wherein the processing device to select the one or more non-provisioned physical resources further comprises the processing device to:
identify one of the individual physical resources having a utilization that meets a utilization threshold; and
select the one of the individual physical resources.

10. The non-transitory computer-readable storage medium of claim 8, wherein the processing device to add the selected one or more non-provisioned physical resources further comprises the processing device to send one or more messages to a service in an infrastructure platform to add the selected one or more non-provisioned physical resources to the cluster.

11. The non-transitory computer-readable storage medium of claim 10, wherein the one or more messages comprise at least one of an identifier of the non-provisioned physical resource or an identifier of the cluster.

12. The non-transitory computer-readable storage medium of claim 8, wherein the non-provisioned physical resource comprises at least one of a bare metal system, a host computing machine, or a storage device.

13. The non-transitory computer-readable storage medium of claim 8, wherein the cluster comprises at least one of a cluster that is dedicated to providing one or more virtual machines, a cluster that is dedicated to providing a storage service, or a cluster that is dedicated to providing a networking service.

14. A system comprising:
a memory; and
a processing device, operatively coupled to the memory, to:
determine that no physical resource in a plurality of resources of a cluster has available capacity in view of utilization of individual virtual resources and individual physical resources in the cluster;
determine, by the processing device, to add one or more physical resources to the cluster in view of the utilization of the individual virtual resources and the individual physical resources in the cluster;
select, by the processing device, one or more non-provisioned physical resources in view of one or more preferences specified in a policy;
modify, by the processing device, the selected one or more non-provisioned physical resources in view of a cluster type of the cluster; and
add, by the processing device, the selected one or more non-provisioned physical resources to the cluster.

15. The system of claim 14, wherein the processing device to select the one or more non-provisioned physical resources further comprises the processing device to:
identify one of the individual physical resources having a utilization that meets a utilization threshold; and
select the one of the individual physical resources.

16. The system of claim 14, wherein the processing device to add the selected one or more non-provisioned physical resources further comprises the processing device to send one or more messages to a service in an infrastructure platform to add the selected one or more non-provisioned physical resources to the cluster.

17. The system of claim 16, wherein the one or more messages comprise at least one of an identifier of the one or more non-provisioned physical resource or an identifier of the cluster.

18. The system of claim 14, wherein the one or more non-provisioned physical resources comprise at least one of a bare metal system, a host computing machine, or a storage device.

19. The system of claim 14, wherein the cluster comprises at least one of a cluster that is dedicated to providing one or more virtual machines, a cluster that is dedicated to providing a storage service, or a cluster that is dedicated to providing a networking service.

20. The system of claim 14, wherein to determine that no physical resource in the plurality of resources of the cluster has available capacity, the processing device is further to:
determine capacity of physical resources in the plurality of resources; and determine none of the physical resources in the plurality of resources has a capacity that meets a specified minimum amount of capacity.

\* \* \* \* \*

UNITED STATES PATENT AND TRADEMARK OFFICE
CERTIFICATE OF CORRECTION

PATENT NO. : 10,891,168 B2  
APPLICATION NO. : 16/227338  
DATED : January 12, 2021  
INVENTOR(S) : Ladislav Smola and Greg D. Blonquist Page 1 of 1

It is certified that error appears in the above-identified patent and that said Letters Patent is hereby corrected as shown below:

In the Claims

In Claim 17, Column 16, Line 52, after "physical" delete "resource" and insert --resources--

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*